United States Patent
Noda et al.

(10) Patent No.: US 10,359,920 B2
(45) Date of Patent: Jul. 23, 2019

(54) OBJECT MANAGEMENT DEVICE, THINKING ASSISTANCE DEVICE, OBJECT MANAGEMENT METHOD, AND COMPUTER-READABLE STORAGE MEDIUM

(71) Applicant: NEC Solution Innovators, Ltd., Koto-ku, Tokyo (JP)

(72) Inventors: Hisashi Noda, Tokyo (JP); Katsuyuki Nagai, Tokyo (JP); Tomomi Kinoshita, Tokyo (JP); Hiroki Terashima, Tokyo (JP)

(73) Assignee: NEC SOLUTION INNOVATORS, LTD., Tokyo (JP)

(*) Notice: Subject to any disclaimer, the term of this patent is extended or adjusted under 35 U.S.C. 154(b) by 157 days.

(21) Appl. No.: 15/506,856

(22) PCT Filed: Sep. 1, 2015

(86) PCT No.: PCT/JP2015/074896
§ 371 (c)(1),
(2) Date: Feb. 27, 2017

(87) PCT Pub. No.: WO2016/035800
PCT Pub. Date: Mar. 10, 2016

(65) Prior Publication Data
US 2017/0255369 A1  Sep. 7, 2017

(30) Foreign Application Priority Data
Sep. 5, 2014  (JP) .................... 2014-180846

(51) Int. Cl.
*G06F 3/0484* (2013.01)
*G06F 3/048* (2013.01)
(Continued)

(52) U.S. Cl.
CPC .......... *G06F 3/04845* (2013.01); *G06F 3/048* (2013.01); *G06F 3/0481* (2013.01);
(Continued)

(58) Field of Classification Search
CPC ..... G06F 3/04845; G06F 3/048; G06F 3/0481
See application file for complete search history.

(56) References Cited

U.S. PATENT DOCUMENTS

| 5,784,061 A | 7/1998 | Moran et al. |
| 2006/0112354 A1 | 5/2006 | Park et al. |

(Continued)

FOREIGN PATENT DOCUMENTS

| EP | 2463768 A2 | 6/2012 |
| JP | H10-063462 A | 3/1998 |

(Continued)

OTHER PUBLICATIONS

Vaoya Enokida, "IDEABOOST" [online], searched on Jul. 9, 2012, URL: http://ideaboostjp.strikingly.com/ (cited in the Specification).
(Continued)

*Primary Examiner* — David E Choi

(57) ABSTRACT

An object management device 10 includes: a group setting unit 11 that, if a frame line surrounding objects on a screen is rendered, sets a group to which the one or more objects located inside of the frame line are to belong; a position detection unit 12 that detects positions of the one or more objects belonging to the set group, using the frame line as a reference; and a group moving unit 13 that, if movement is instructed for the group, moves the frame line and the one or more objects in a state in which the positional relationships therebetween are maintained, based on the detected positions of the one or more objects.

16 Claims, 14 Drawing Sheets

(51) Int. Cl.
  *G06F 3/0482* (2013.01)
  *G06F 3/0481* (2013.01)
  *G06Q 10/00* (2012.01)
  *G06Q 10/10* (2012.01)
  *G06F 3/0488* (2013.01)
  *G06F 3/0486* (2013.01)

(52) U.S. Cl.
  CPC ........ *G06F 3/0482* (2013.01); *G06F 3/04883* (2013.01); *G06Q 10/00* (2013.01); *G06Q 10/101* (2013.01); *G06F 3/0486* (2013.01)

(56) References Cited

U.S. PATENT DOCUMENTS

| | | | |
|---|---|---|---|
| 2006/0238498 A1 | 10/2006 | Kando et al. | |
| 2008/0297482 A1 | 12/2008 | Weiss | |
| 2008/0301565 A1* | 12/2008 | Abhyanker | G06F 3/0481 715/744 |
| 2009/0024965 A1* | 1/2009 | Zhdankin | G06F 17/2785 715/863 |
| 2010/0007623 A1 | 1/2010 | Kaneko et al. | |
| 2010/0083111 A1 | 4/2010 | De Los Reyes | |
| 2012/0179997 A1* | 7/2012 | Miyazaki | G06F 3/04842 715/830 |
| 2014/0316931 A1* | 10/2014 | Selcuk | G06O 30/0643 705/26.5 |
| 2015/0052465 A1* | 2/2015 | Altin | G06F 3/04842 715/769 |
| 2017/0255369 A1* | 9/2017 | Noda | G06F 3/0482 |

FOREIGN PATENT DOCUMENTS

| | | |
|---|---|---|
| JP | 2004-110734 A | 4/2004 |
| JP | 2007-328456 A | 12/2007 |
| JP | 4385770 B2 | 12/2009 |
| JP | 2010-040029 | 2/2010 |
| WO | 2006/028154 A1 | 3/2006 |
| WO | 2006/117438 A1 | 11/2006 |

OTHER PUBLICATIONS

RICOH Japan, "RICOH TAMAGO Idea Card" [online], searched on Jul. 9, 2014, URL: http://www.ricoh.co.jp/software/tamago/idea-card/ (cited in the Specification).
Word Press, "iCard Sort" [online], searched on Jul. 9, 2012, URL: http://icardsort.com/ (cited in the Specification).
Qrayon, "Stickyboard" [online], searched on Jul. 9, 2012, URL: http://www.grayon.com/home/stickyboard/ (cited in the Specification).
"Memo' o Tsukai Konashite Jigyo Kikaku ya Mondai Kaiketsu ni Idomu", Nikkei Personal Computing, Jan. 15, 1996, vol. 256, pp. 258 to 263, ISSN 0287-9506. (cited in ISR).
International Search Report for PCT Application No. PCT/JP2015/074896, dated Nov. 17, 2015.
Extended European Search Report for EP Application No. EP15838955.1 dated Mar. 27, 2018.
Japanese Office Action for JP Application No. 2016-546663 dated Sep. 12, 2017 with English Translation.

* cited by examiner (a)

(b)

(a)
EXPANDED STATE (b)
CONVERGED STATE (a)

EXPANDED STATE (b)

CONVERGED STATE (a)

(b)

OBJECT MANAGEMENT DEVICE, THINKING ASSISTANCE DEVICE, OBJECT MANAGEMENT METHOD, AND COMPUTER-READABLE STORAGE MEDIUM

This application is a National Stage Entry of PCT/JP2015/074896 filed on Sep. 1, 2015, which claims priority from Japanese Patent Application 2014-180846 filed on Sep. 5, 2014, the contents of all of which are incorporated herein by reference, in their entirety.

TECHNICAL FIELD

The present invention relates to an object management device and an object management method for managing objects such as cards displayed on a screen, and furthermore relates to an object thinking assistance device that uses the object management device and object management method, and to a computer-readable storage medium storing a program for realizing the object management device, object management method, and object thinking assistance device.

BACKGROUND ART

In recent years, in business, situations in which creation of ideas is required, such as planning a new enterprise, improving business operations, and solving problems, have been increasing. For this reason, various thinking tools for assisting the creation of ideas have been developed (e.g., see Non-Patent Documents 1 to 4). Also, such a thinking tool can operate on an information apparatus such as a smartphone, a tablet-type terminal, or a personal computer (hereinafter denoted as a "PC"), and therefore a user can use the thinking tool anywhere at any time.

A specific example of a thinking tool will be described here. For example, Non-Patent Documents 1 to 4 disclose thinking tools that each assist the creation of ideas by a user by displaying a canvas and objects called "sticky notes" (or cards) on a screen. With the thinking tools disclosed in Non-Patent Documents 1 to 4, a user can write an idea on a sticky note by hand-written input or the like, and sticky notes on which ideas have been written can be laid out freely on the canvas. Accordingly, the user can intuitively keep track of the ideas that he or she created, and can easily select an idea that is optimal for achieving a goal and refine the created ideas.

Also, various functions can be added to these thinking tools in order to improve user-friendliness. For example, a function according to which a frame line surrounding multiple sticky notes can be rendered according to user input is added to the thinking tool disclosed in Non-Patent Document 2. With this function, the user can visually group together multiple sticky notes on which similar content has been written, and therefore ideas can be efficiently organized, refined, and the like.

A function according to which when a user brings sticky notes into contact with each other, the sticky notes that are in contact are grouped together in that state, and a function according to which the sticky notes that were grouped together are arranged separately and thereafter can be returned to the original state of being in contact with each other by one action, are added to the thinking tool disclosed in Non-Patent Document 3. With these functions, the user can easily check the set groups at any time, and therefore can efficiently perform organization, refining, and the like of ideas in this case as well.

Also, the tool disclosed in Non-Patent Document 3 includes a function of arranging grouped-together sticky notes in a fan shape in a state of being in contact with each other. According to this function, intervals between groups can be ensured, and boundaries between groups can be made clear in a device with a narrow screen, such as a mobile terminal or a tablet-type terminal.

In addition, Patent Document 1 discloses a technique in which, when multiple sticky notes displayed in an electronic document are at the same position or positions close to each other, the sticky notes are grouped together, and the grouped-together sticky notes are displayed overlapping each other. In the case where the technique disclosed in Patent Document 1 is applied to a thinking tool, it is thought that an increase in the efficiency of organization, refining, and the like of ideas will be achieved, as described above.

LIST OF PRIOR ART DOCUMENTS

Patent Document

Patent Document 1: Japanese Patent No. 4385770

Non-Patent Document

Non-Patent Document 1: Naoya Enokida, "IDEABOOST", [online], [searched for on Jul. 9, 2012], Internet <http://ideaboostjp.strikingly.com/>

Non-Patent Document 2: RICOH Japan, "RICOH TAMA-GOIdea Card" [online], [searched for on Jul. 9, 2014], Internet <http://www.ricoh.co.jp/software/tamago/idea-card/>

Non-Patent Document 3: Word Press, "iCard Sort" [online], [searched for on Jul. 9, 2012], Internet <http://icardsort-.com/>

Non-Patent Document 4: Qrayon, "Sticky board" [online], [searched for on Jul. 9, 2012], Internet <http://www.qrayon.com/home/stickyboard/>

DISCLOSURE OF THE INVENTION

Problems to be Solved by the Invention

Accordingly, if the techniques disclosed in Non-Patent Document 2, Non-Patent Document 3, and Patent Document 1 are used, sticky notes displayed on a screen can be grouped together and user-friendliness can be improved, but these techniques have the following problems.

First, with the thinking tool disclosed in Non-Patent Document 2, since a frame line indicating a group is merely rendered on the screen, there is a problem in that the user cannot collectively move the multiple sticky notes grouped together using the frame line. Similarly, with the thinking tool disclosed in Non-Patent Document 3 and the technique disclosed in Patent Document 1 as well, no consideration has been given to moving sticky notes in groups, and thus the user cannot collectively move multiple grouped-together sticky notes. For this reason, in the case of using either technique, the user needs to move the sticky notes belonging to a group one-by-one when grouped-together sticky notes are to be moved.

In addition, with the thinking tool disclosed in Non-Patent Document 3 and the technique disclosed in Patent Document 1, there are restrictions on the positions of the sticky notes after being grouped. That is, with the thinking tool disclosed in Non-Patent Document 3, the grouped-together notes need to be in contact with each other. Also, with the technique disclosed in Patent Document 1, the grouped-together sticky notes need to be overlaid in a normal line direction of the screen. For this reason, there is a possibility that free thinking of the user will be hindered.

An example of an object of the present invention is to provide an object management device, a thinking assistance device, an object management method, and a computer-readable storage medium, according to which the foregoing problems are solved and movement of objects in a grouped-together state can be enabled in the case where objects displayed on a screen have been grouped together.

Means for Solving the Problems

In order to achieve the above-described object, an object management device according to an aspect of the invention is an object management device for managing objects displayed on a screen, including:

a group setting unit configured to, if a frame line surrounding one or more of the objects is rendered on the screen, set a group to which the one or more objects located in the frame line belong;

a position detection unit configured to detect positions of the one or more objects belonging to the set group, using the frame line as a reference; and a group moving unit configured to, if moving is instructed for a group, move the frame line and the one or more objects based on the positions of the one or more objects detected by the position detection unit, in a state in which positional relationships between the frame line and the one or more objects are maintained.

In order to achieve the above-described object, a thinking assistance apparatus according to an aspect of the invention is a thinking assistance device for assisting thinking of a user using card-shaped objects displayed on a screen, including:

a display unit configured to display a canvas on the screen and furthermore display the card-shaped objects at a designated position on the canvas; a text writing unit configured to write input text on the designated card-shaped object; and an object management unit, wherein the object management unit includes:

a group setting unit configured to, if a frame line surrounding one or more of the card-shaped objects has been rendered on the screen, set a group to which the one or more card-shaped objects located inside of the frame line belong;

a position detection unit configured to detect positions of the one or more card-shaped objects belonging to the set group, using the frame line as a reference; and a group moving unit configured to, if moving is instructed for the group, move the frame line and the one or more card-shaped objects based on the positions of the one or more card-shaped objects detected by the position detection unit, in a state in which positional relationships between the frame line and the one or more card-shaped objects are maintained.

Also, in order to achieve the above-described object, an object management method according to an aspect of the invention is an object management method for managing objects displayed on a screen, including:

a step (a) of, if a frame line surrounding one or more of the objects is rendered on the screen, setting a group to which the one or more objects located in the frame line belong;

a step (b) of detecting positions of the one or more objects belonging to the set group, using the frame line as a reference; and a step (c) of, if movement is instructed for the group, moving the frame line and the one or more objects based on the positions of the one or more objects detected in the step (b), in a state in which positional relationships between the frame line and the one or more objects are maintained.

Furthermore, in order to achieve the above-described object, a computer-readable storage medium according to an aspect of the invention is a computer-readable storage medium storing a program for managing objects displayed on a screen by a computer, including commands for causing the computer to execute:

a step (a) of, if a frame line surrounding one or more of the objects is rendered on the screen, setting a group to which the one or more objects located in the frame line belong;

a step (b) of detecting positions of the one or more objects belonging to the set group, using the frame line as a reference; and a step (c) of, if moving is instructed for a group, moving the frame line and the one or more objects based on the positions of the one or more objects detected in the step (b), in a state in which positional relationships between the frame line and the one or more objects are maintained.

Advantageous Effects of the Invention

As described above, according to the present invention, movement of objects in a grouped-together state is possible in the case where objects displayed on a screen have been grouped together.

MODE FOR CARRYING OUT THE INVENTION

Embodiment

Hereinafter, an object management device, a thinking assistance device, an object management method, and a program according to an embodiment of the present invention will be described with reference to FIGS. 1 to 14.

Schematic Configuration

Figure 1:
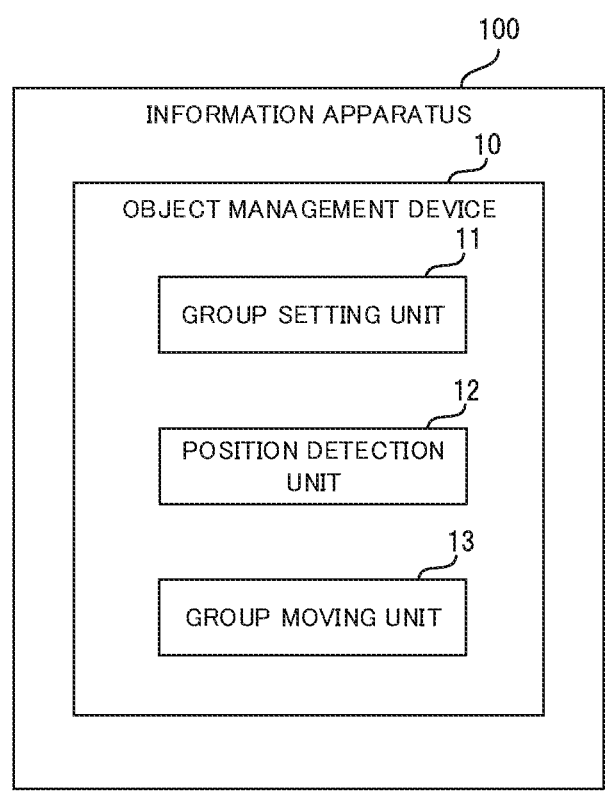
FIG. 1 is a block diagram showing a schematic configuration of an object management device according to an embodiment of the present invention.

First, a configuration of the object management device according to an embodiment of the present invention will be described schematically with reference to FIG. 1. FIG. 1 is a block diagram showing a schematic configuration of the object management device according to an embodiment of the invention.

An object management device 10 according to an embodiment of the present invention shown in FIG. 1 is a device for managing objects displayed on a screen. In the present embodiment, the object management device 10 is a device that functions in an information apparatus 100 such as a smartphone, a tablet-type terminal, or a PC, and in actuality, the object management device 10 is constructed by a program.

As shown in FIG. 1, the object management device 10 includes a group setting unit 11, a position detection unit 12, and a group moving unit 13. Among these, the group setting unit 11 sets a group to which, in the case where a frame line surrounding one or more objects has been drawn on the screen, the one or more objects located inside of the frame line belong. When the group is set, the position detection unit 12 detects the positions of the one or more objects belonging to the set group, using the frame line as a reference.

If moving is instructed for the group, the group moving unit 13 moves the frame line and the one or more objects in a state in which the positional relationship therebetween is maintained, based on the positions of the one or more objects detected by the position detection unit 12. Specifically, based on the positions of the objects obtained using the detected frame line as a reference, the group moving unit 13 calculates the coordinates of the frame line and the coordinates of the objects at the instructed moving location such that the positional relationships between the frame line and the objects is maintained.

Thus, in the present embodiment, the positional relationships between the frame line rendered on the screen and the objects is specified, and therefore if objects displayed on a screen are grouped together, it is possible to move the objects in a grouped-together state. Also, since a frame line surrounding the objects is drawn on the screen, the user can visually keep track of whether or not an object belongs to a group. Furthermore, since the user can group together objects with only a one-step operation of rendering a frame line, it can be said that user-friendliness is high.

Specific Configuration

Figure 2:
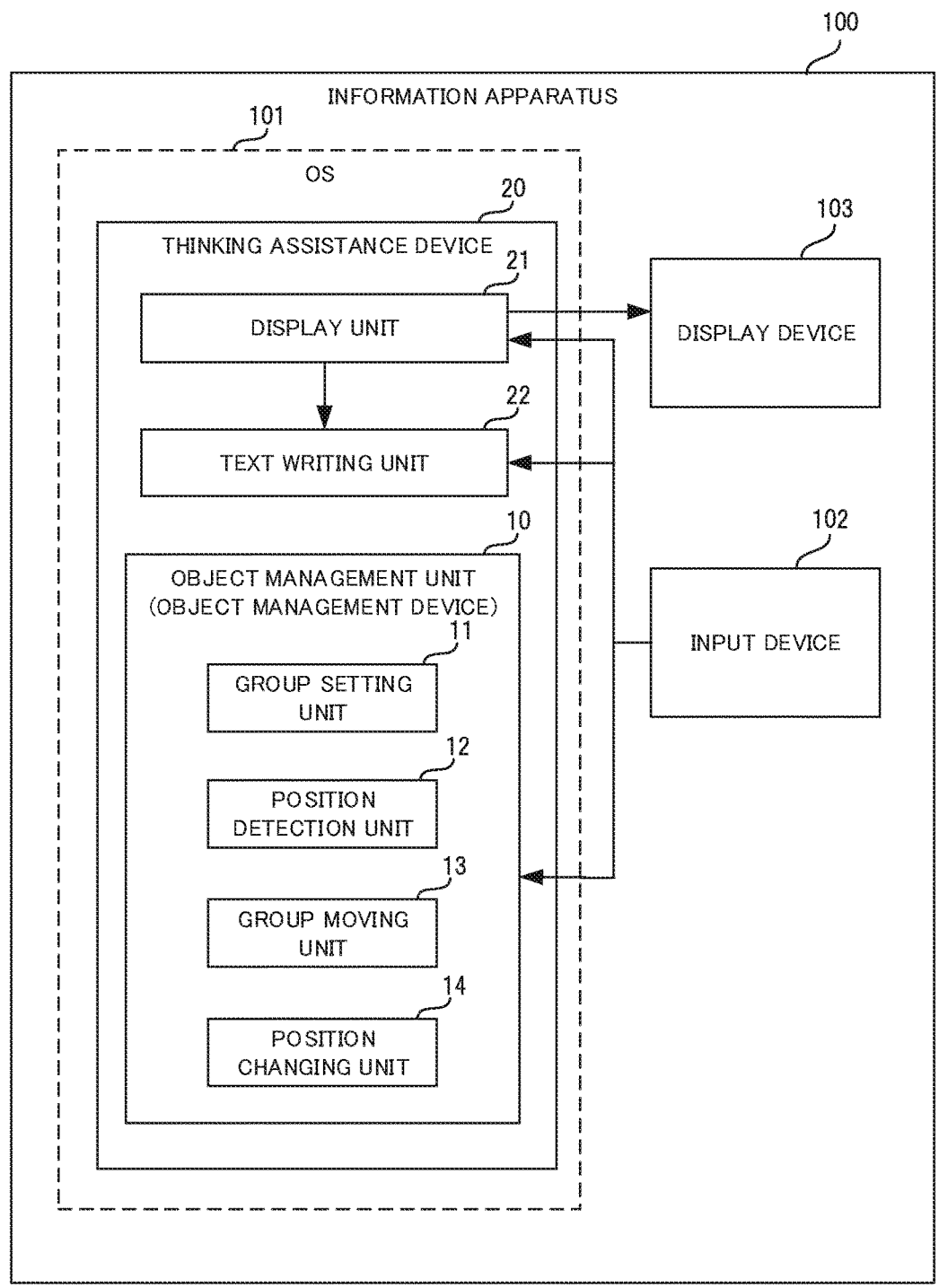
FIG. 2 is a block diagram showing configurations of an object management device and a thinking assistance device according to an embodiment of the present invention.
Figure 3:
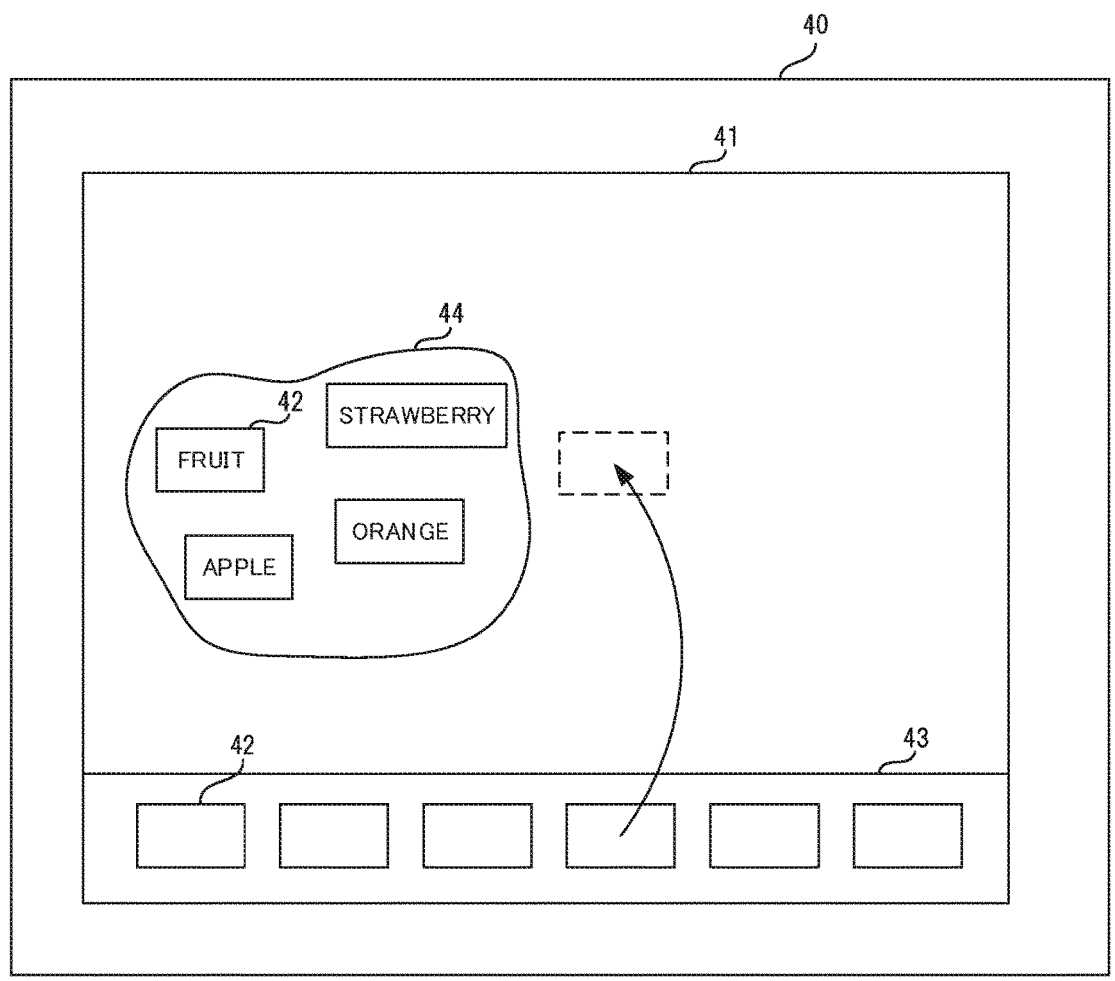
FIG. 3 is a block diagram showing an example of objects displayed on a screen according to an embodiment of the present invention.

Here, the configuration of the object management device according to the present embodiment will be described in further detail with reference to FIGS. 2 and 3. FIG. 2 is a block diagram showing configurations of the object management device and the thinking assistance device according to an embodiment of the invention. FIG. 3 is a diagram showing an example of objects displayed on a screen in an embodiment of the present invention.

First, as shown in FIG. 2, in the present embodiment, the information apparatus 100, which was also shown in FIG. 1, includes the thinking assistance device 20. Also, the object management device 10 is included in the thinking assistance device 20 and functions as an object management unit. Specifically, the thinking assistance device 20 is constructed by a program that operates on an OS (Operating System) 101 of the information apparatus 100. The object management device 10 is constructed by a program module included in the program.

Also, in FIG. 2, the object management device 10 is denoted as "object management unit 10". In the present embodiment, the information apparatus 100 includes a display device 103 such as a liquid crystal display panel, and an input device 102 through which pointing can be performed, such as a touch panel, a gesture input device, a keyboard, or a mouse.

The thinking assistance device 20 is a device for assisting the thinking of a user using card-shaped objects (hereinafter denoted as "card objects") displayed on a screen, and functions as a so-called thinking tool. As shown in FIG. 2, the thinking assistance device 20 includes a display unit 21, a text writing unit 22, and the above-described object management unit 10.

Among these, the display unit 21 displays a canvas 41 on the screen 40 as shown in FIG. 3. Also, as shown in FIG. 3, the display unit 21 displays the card-shaped objects (hereinafter denoted as "card objects") 42 at designated positions on the canvas 41. The text writing unit 22 writes input text on a designated card object 42.

Specifically, first, the user selects a card object 42 in a preparation region 43 (see FIG. 3) via the input device 102, and furthermore inputs text representing an idea to the selected card object 42. Thus, the text writing unit 22 writes the input text on the selected card object 42. Then, when the user selects a certain card object 42 via the input device 102 and moves the certain card object 42 to a certain position on the canvas 41 (see FIG. 3) through a drag operation, a drop operation, and the like, the display unit 21 moves the card object 42 on which the idea was written to the certain position.

Accordingly, with the thinking assistance device 20, the user can use the card objects 42 on the canvas 41 to organize and refine his or her ideas. As a result, the user is assisted in his or her thinking.

Also, in the present embodiment, in the thinking assistance device 20, the object management unit (object management device) 10 executes grouping processing and the like on the card objects 42 (see FIG. 3).

That is, in the present embodiment, when the user draws a frame line 44 surrounding card objects 42 via the input device 102 (see FIG. 3), the group setting unit 11 sets a group to which the one or more card objects 42 located inside of the frame line 44 belong. Also, when a group is set, the position detection unit 12 detects the locations of the one or more card objects 42 belonging to the set group, using the frame line 44 as a reference.

When the user instructs movement of a group using a drag operation and the like via the input device 102, the group movement unit 13 moves the frame line 44 and the card objects 42 in a state in which the positional relationships thereof are maintained, based on the positions of the card objects 42 detected by the position detection unit 12.

Specifically, the group movement unit 13 sequentially calculates the coordinates of the frame line 44 and the coordinates of the card objects 42 for each point from the original position to the moving destination, and outputs the calculated coordinates to the display unit 21. Accordingly, the display unit 21 displays the frame line 44 and the card objects 42 constituting the group moving on the screen 41.

Also, in the present embodiment, the object management unit 10 furthermore includes a position changing unit 14 in addition to the above-described group setting unit 11, position detection unit 12, and group moving unit 13. When one of the two or more card objects 42 located inside of the frame line 44 are designated by the user, the position changing unit 14 can set the card objects 42 to a converged state by overlaying them in the normal line direction of the screen 40, such that the designated card object 42 is located at the frontmost position.

Also, when two or more card objects 42 are in the converged state, the position detection unit 12 detects the positions of the card objects 42 in the converged state. Also, when two or more card objects 42 are in the converged state, if movement of the group is instructed, the group movement unit 13 moves the frame line 44 and the card objects 42 with the converged state maintained.

Also, when the user instructs canceling of the converged state, or in other words, canceling of overlaying, the position changing unit 14 can return the positions of the card objects 42 overlaid in the normal line direction of the screen 40 to their positions prior to overlaying being performed, and thus set the original, expanded state.

Also, in the present embodiment, when another card object 42 not belonging to a group is moved by the user inside of the frame line 44 by which the group is set, the group setting unit 11 can cause the other card object 42 that was moved to belong to that group. Also, in this case, the position detection unit 12 detects the position of the other card object 42 using the frame line 44 of the group to which the other card object 42 newly belongs as a reference.

Furthermore, if canceling of a group setting is instructed by the user, or if processing for erasing the frame line 44 is performed by the user, the group setting unit 11 can cancel the corresponding group setting.

Also, when a new frame line 44 is rendered, if another frame line 44 by which a group has already been set exists inside of the new frame line 44, the group setting unit 11 can set a new group including the card objects 42 inside of the other frame line 44. Furthermore, in this case, the group setting unit 11 gives the new group a higher rank than the group that was already set.

Furthermore, if a new frame line 44 is rendered within a frame line 44 that has already been drawn, the group setting unit 11 sets a new group for the one or more card objects 42 located within the new frame line 44. Also, in this case, the group setting unit 11 gives the new group a lower rank than the group of the frame line 44 that was already rendered.

Thus, the group setting unit 11 can newly set a higher-rank group including an already-existing group and a lower-rank group included in an already-existing group, and thus the user can visually keep track of the hierarchical relationship between the objects.

Operation

Figure 4:
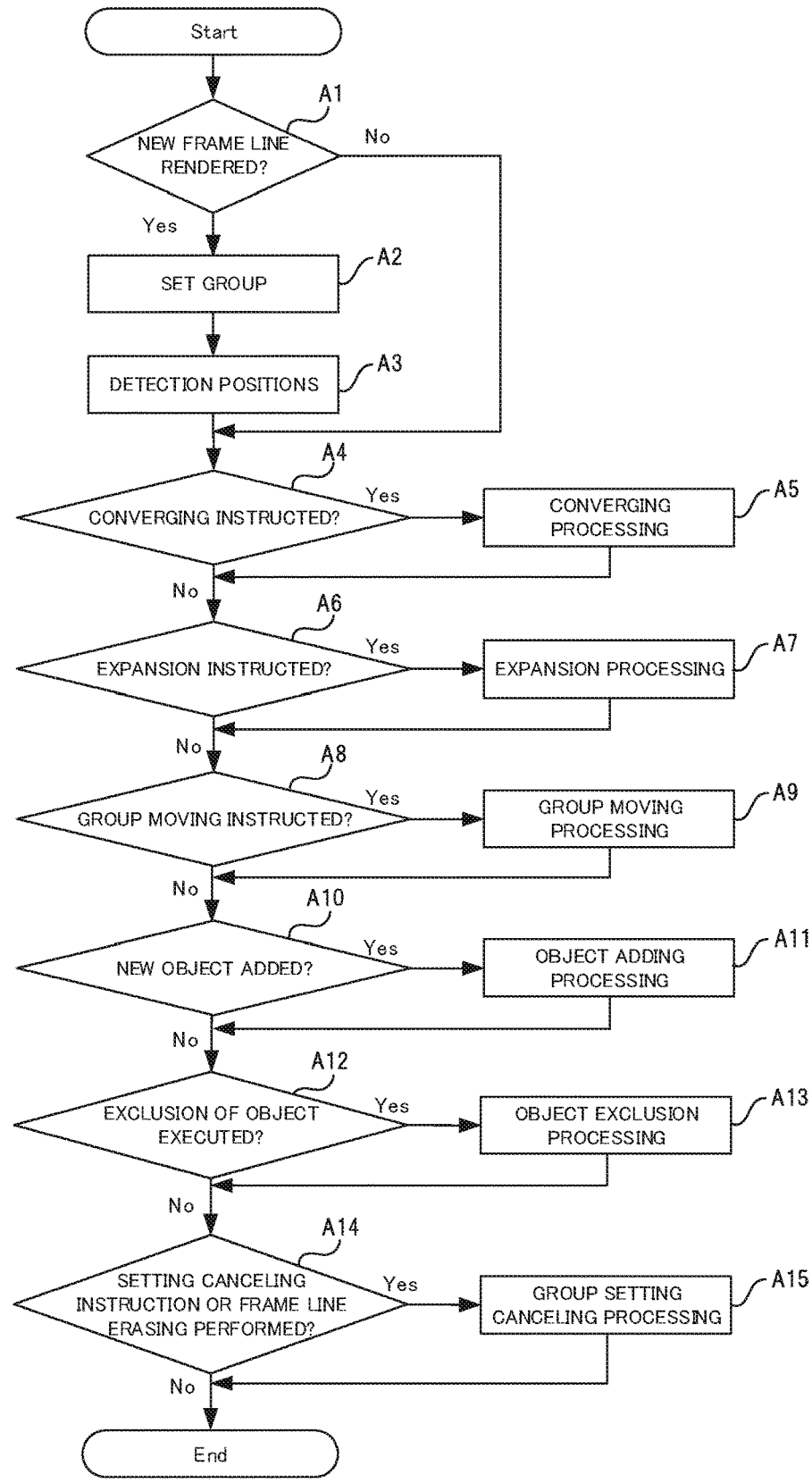
FIG. 4 is a flowchart showing an operation of the object management device according to an embodiment of the present invention.

Next, an operation of the object management device 10 according to an embodiment of the present invention will be described with reference to FIG. 4. FIG. 4 is a flowchart showing an operation of the object management device according to an embodiment of the invention. The following description will be given with reference to FIGS. 1 to 3 as appropriate. Also, in the present embodiment, an object management method is carried out by causing the object management device to operate. Accordingly, the description of the object management method according to the present embodiment is substituted with the following description of the operation of the object management device (object management unit) 10.

As shown in FIG. 4, first, in the object management device 10, the group setting unit 11 determines whether or not a frame line 44 surrounding the card objects 42 has been rendered on the canvas 41 on the screen 40 (see FIG. 3) (step A1).

Figure 5:
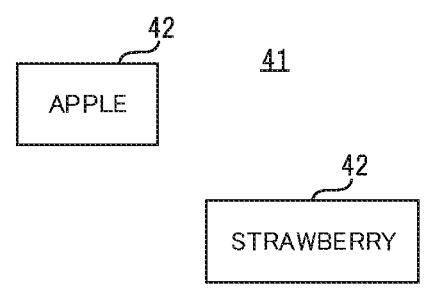
FIGS. 5(a) and 5(b) are diagrams for illustrating processing performed in step A1 shown in FIG. 4, FIG. 5(a) showing a state before a frame line is rendered, and FIG. 5(b) showing a state after a frame line is rendered.
Figure 5:
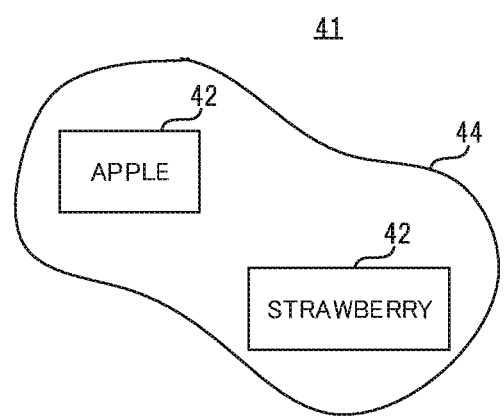

Step A1 will be described in detail with references to FIGS. 5(*a*) and 5(*b*). FIGS. 5(*a*) and 5(*b*) are diagrams for describing the processing performed in step A1 shown in FIG. 4, FIG. 5(*a*) showing a state before the frame line is rendered, and FIG. 5(*b*) showing a state after the frame line is rendered.

For example, as shown in FIGS. 5(*a*) and 5(*b*), it is assumed that the display unit 21 (see FIG. 2) has rendered the frame line 44 surrounding the card objects 42 on the canvas 41 based on hand-written input performed via the touch panel by the user.

In this case, the group setting unit 11 extracts the coordinates on the frame line 44, and for each card object 42 on the canvas 41, compares the extracted coordinates on the frame line 44 and coordinates of the reference point of the card object 42. Thus, the group setting unit 11 checks whether or not card objects 42 surrounded by the frame line 44 exist. If it is found as a result of checking that card objects 42 surrounded by the frame line 44 exist, the group setting unit 11 determines that the frame line 44 surrounding the card objects 42 was newly rendered. Note that the reference point of a card object 42 is set in the center, for example, but there is no particular limitation on the position of the reference point.

Also, in the example shown in FIGS. 5(*a*) and 5(*b*), the frame line 44 is rendered along a line input through handwriting by the user, but the present embodiment is not limited to this example. For example, it is assumed that a straight line tool for rendering a straight line by designating two points, a curved line tool for rendering a free curved line based on designated points, a rectangle tool for rendering a rectangle by designating two points that are diagonal from each other, and the like are prepared in advance in the thinking assistance device 20. In this case, the frame line 44 may be rendered by the user operating a tool. Also, in the case where a frame line is input through handwriting, the thinking assistance device 20 may perform correction such that the frame line is constituted by a smooth frame line.

If it is found as a result of the determination in step A1 that no new frame line 44 has been rendered, step A4 is executed. On the other hand, if it is found as a result of the determination in step A1 that a new frame line 44 has been rendered, the group setting unit 11 sets a group to which the card objects 42 located inside of the frame line 44 belong (step A2).

Figure 6:
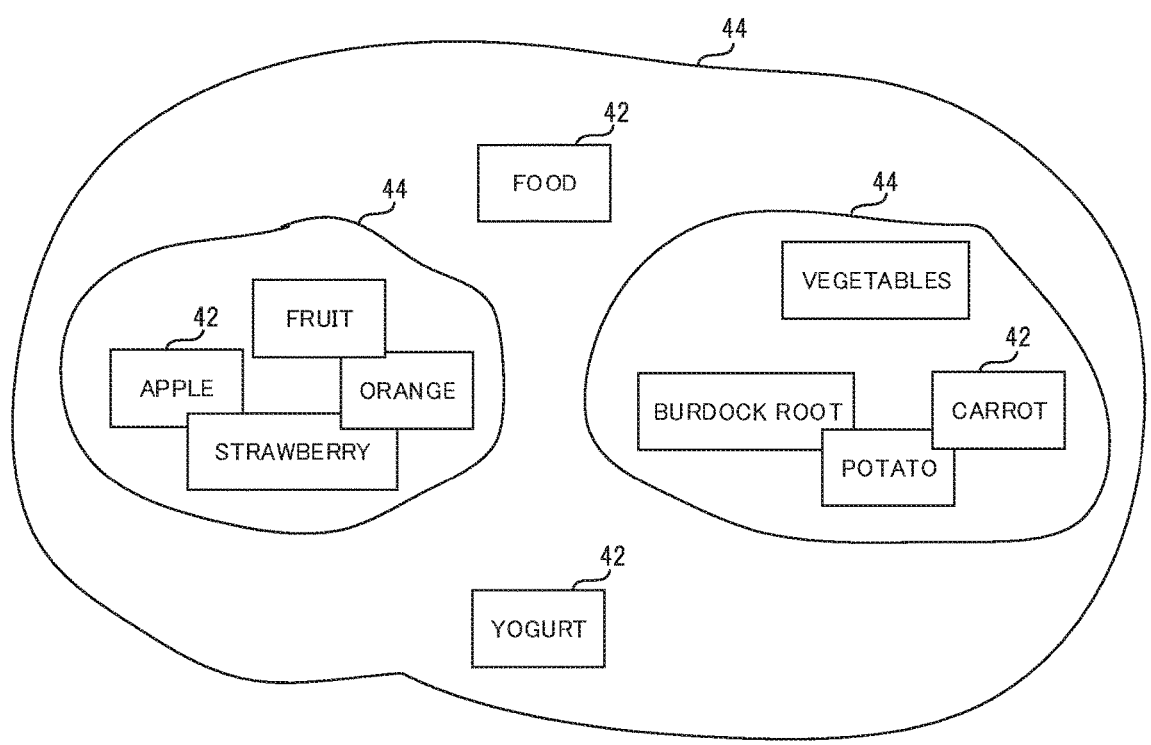
FIG. 6 is a diagram showing an example of a case where multiple other frame lines are drawn inside of one frame line.
Figure 7:
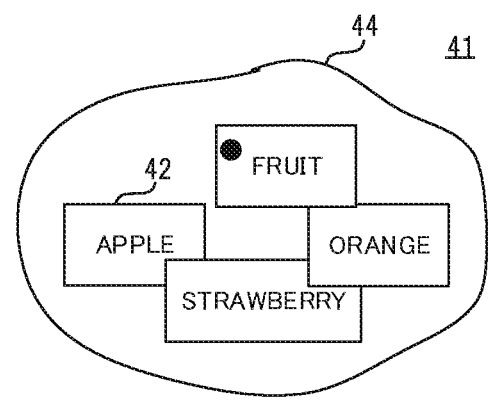
FIGS. 7(a) and 7(b) are diagrams for illustrating processing performed in step A5 shown in FIG. 4, FIG. 7(a) showing an expanded state, and FIG. 7(b) showing a converged state.
Figure 7:
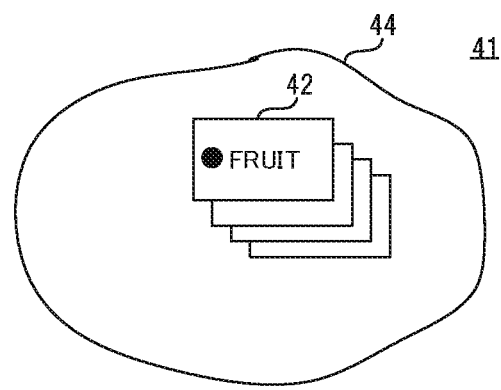
Figure 8:
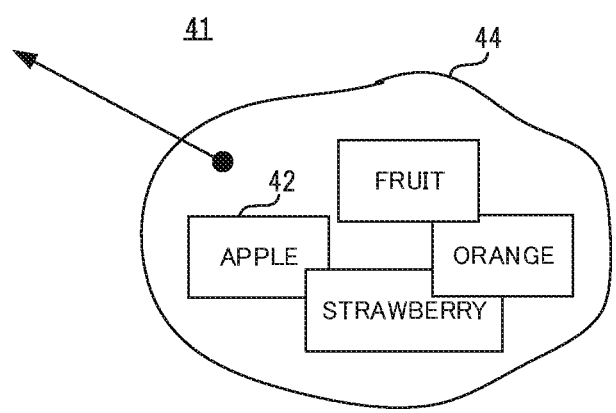
FIGS. 8(a) and 8(b) are diagrams for illustrating processing performed in step A9 shown in FIG. 4, FIG. 8(a) showing moving in the expanded state, and FIG. 8(b) showing moving in the converged state.
Figure 8:
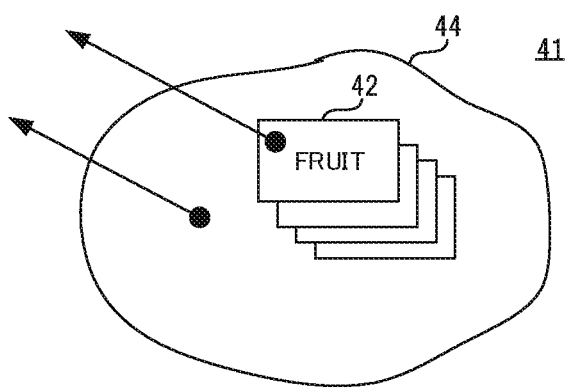
Figure 9:
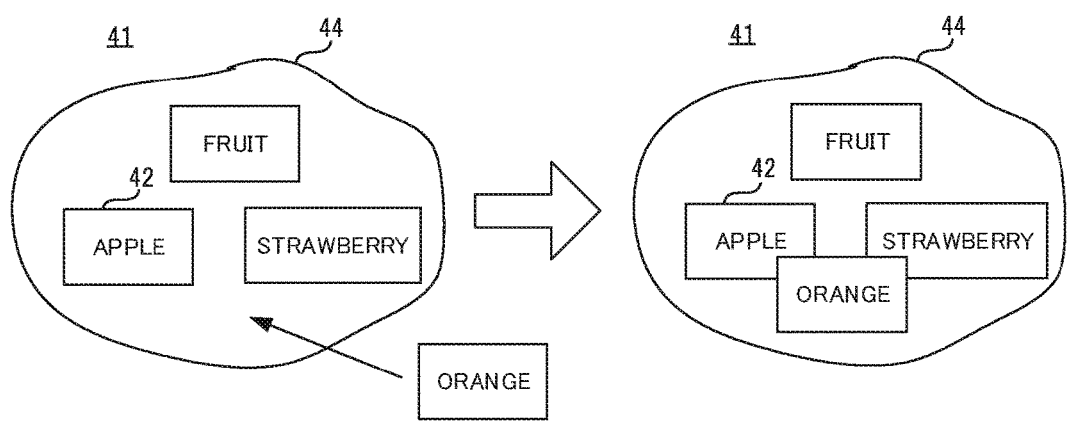
FIGS. 9(a) and 9(b) are diagrams for illustrating processing performed in step A11 shown in FIG. 4, FIG. 9(a) showing adding in the expanded state, and FIG. 9(b) showing adding in the converged state.
Figure 9:
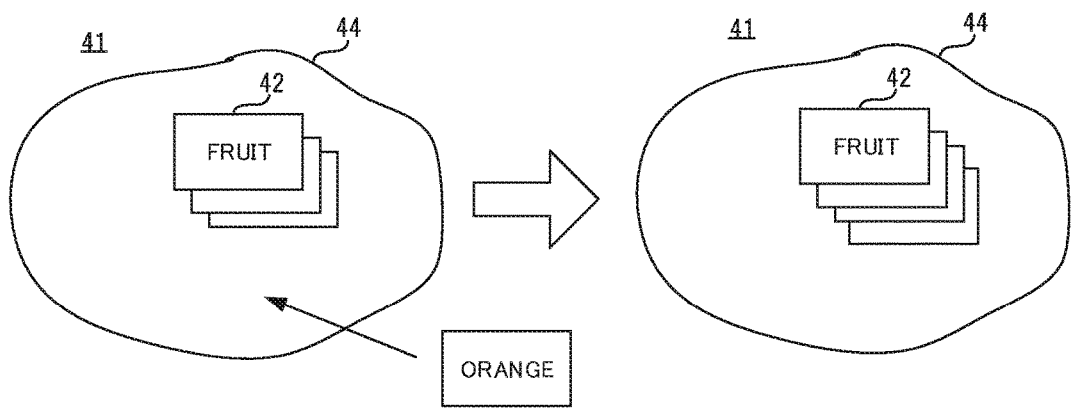

If a new frame line 44 is rendered so as to surround the frame line 44 that has already been rendered, in step A2, the group setting unit 11 sets a new higher-rank group including the group that was already set. On the other hand, if a new frame line 44 is rendered inside of the frame line 44 that has already been drawn, in step A2, the group setting unit 11 sets a new lower-level group within the group that was already set. FIG. 6 is a diagram showing an example of a case where multiple other frame lines are rendered inside of one frame line.

Next, after step A2 is executed, the position detection unit 12 detects the positions of the card objects 42 belonging to the set group, using the frame line 44 as a reference (step A3). Specifically, the position detection unit 12 calculates the coordinates and orientations of the reference points of the card objects 42 using the reference point of the frame line 44 as the origin, and stores the calculated coordinates and orientations in a memory (not shown in FIGS. 1 and 2) of the information apparatus 100 as relative position information.

Next, after step A3 is executed, the position changing unit 14 determines whether or not converging has been instructed for a specific group by the user (step A4). If it is found as a result of the determination in step A4 that converging has not been instructed, step A6 is executed. On the other hand, if it is found as a result of the determination in step A4 that converging has been instructed, the position changing unit 14 sets the card objects 42 in the group for which converging was instructed to the converged state by overlaying the card objects 42 in the normal line direction of the screen 40 (step A5).

Step A5 will be described in detail with reference to FIGS. 7(a) and 7(b). FIGS. 7(a) and 7(b) are diagrams for describing the processing performed in step A5 shown in FIG. 4, FIG. 7(a) showing an expanded state, and FIG. 7(b) showing a converged state.

First, as shown in FIG. 7(a), it is assumed that among the multiple card objects 42 belonging to a specific group, the user has designated a card object 42 on which "fruit" has been written, through an operation such as a double tap, or the like. In this case, as shown in FIG. 7(b), the position changing unit 14 overlays the card objects 42 belonging to the group in the normal line direction of the screen 40 such that the designated card object 42 is located at the frontmost position. Note that in FIGS. 7(a) and 7(b), the black circle indicates a position designated by the user.

Also, in the present embodiment, as shown in FIG. 7(b), when the position changing unit 14 sets the card objects 42 to the converged state, a portion of the card objects 42 on the rear surface side can be caused to protrude from behind the card object 42 in the front without being completely overlaid. This makes it easier for the user to keep track of the number of card objects 42 belonging to the group, even in the converged state.

Also, in the example shown in FIG. 7(b), even if the converged state is entered, the shape and size of the frame line 44 does not change. This is for allowing the user to recognize the region that is needed at the time of later-described expanding processing. Note that in order to deal with the case where the screen of the information apparatus 100 is small, the position changing unit 14 may reduce the size of the frame line 44 when the converged state is set.

Next, the position changing unit 14 determines whether or not expansion of a group in the converged state has been instructed by the user (step A6). If it is found as a result of the determination in step A6 that expansion has not been instructed, step A8 is executed. On the other hand, if it is found as a result of the determination in step A6 that expansion has been instructed, the position changing unit 14 cancels the converged state in the group for which expansion was instructed, returns the positions of the card objects 42 to their positions prior to overlaying being performed, and thereby sets the original expanded state (step A7).

Specifically, it is assumed that the user has designated the frontmost card object 42 in the group in the converged state using an operation such as a double tap (see FIG. 7(b)). In this case, the position changing unit 14 returns the card objects 42 to the original expanded state (see FIG. 7(a)).

Next, the group moving unit 13 determines whether or not moving of the group has been instructed by the user (step A8). If it is found as a result of the determination in step A8 that moving of the group has not been instructed, step A10 is executed. On the other hand, if it is determined as a result of the determination in step A8 that moving of the group was instructed, the group moving unit 13 moves the group for which movement was instructed by the user to an instructed location, in a state in which the positional relationship between the frame line 44 and the card objects 42 constituting the group is maintained (step A9).

Step A9 will be described in detail with reference to FIGS. 8(a) and 8(b). FIGS. 8(a) and 8(b) are diagrams for describing the processing performed in step A9 shown in FIG. 4, FIG. 8(a) showing moving in the expanded state, and FIG. 8(b) showing moving in the converged state.

For example, it is assumed that, using the group in the expanded state as a target, the user has touched a region in which the card objects 42 inside the frame line 44 do not exist, dragged the group in that state, and dropped the group at a point that is the moving destination, as shown in FIG. 8(a). Note that in FIGS. 8(a) and 8(b), the black circle indicates the position touched by the user.

In this case, the group moving unit 13 specifies the position of a finger of the user at that time according to the movement of the finger, and uses the relative position information calculated in step A3 to calculate the coordinates of the frame line 44 and the card objects 42 of the group for which moving was instructed, so as to correspond to the specified position. Then, the group moving unit 13 sequentially outputs the calculated coordinates to the display unit 21 so as to match the movement of the finger of the user. As a result, as shown in FIG. 8(a), the group in the expanded state is moved to the moving destination as-is.

Also, for example, as shown in FIG. 8(b), if the user instructs movement when the group that is to be moved is in the converged state, the group moving unit 13 moves the group to the moving destination in the converged state. Note that in the example shown in FIG. 8(b), the user can move the group by performing touching and dragging on a region in which no card object 42 inside the frame line 44 exists, or on the frontmost card object 42.

Also, if a group in the converged state is to be moved, the group moving unit 13 can calculate the coordinates such that the moving of a card object 42 on the rear surface side is performed later than that of the frontmost card object 42. If this kind of processing is performed, display is achieved in which the card object 42 on the rear surface side follows behind the frontmost card object 42, and therefore it is easier for the user to recognize the moving of the group.

Next, the group setting unit 11 determines whether or not adding of a new card object 42 has been performed on an existing group (step A10). Specifically, the group setting unit 11 determines whether or not another card object 42 not belonging to the group has been moved inside of the frame line 44 of a specific group by the user.

If it is found as a result of the determination in step A10 that adding of a new card object 42 has not been performed, step A12 is executed. On the other hand, if it is found as a result of the determination in step A10 that adding of the new card object 42 has been performed, the group setting unit 11 causes the new card object 42 to belong to the group that is the adding destination (step A11). Furthermore, when step A11 is executed, the position detection unit 12 uses the frame line 44 of the group that is the adding destination as a reference to detect the position of the new card object 42, similarly to step A3.

Step A11 will be described in detail with reference to FIGS. 9(a) and 9(b). FIGS. 9(a) and 9(b) are diagrams for describing the processing performed in step A11 shown in FIG. 4, FIG. 9(a) showing adding in an expanded state, and FIG. 9(b) showing adding in a converged state.

As shown in FIG. 9(a), when the group that is the adding destination is in the expanded state, the group setting unit 11 allows the new card object 42 to belong to the group at the position designated by the user. On the other hand, as shown in FIG. 9(b), when the group that is the adding destination is in the converged state, the group setting unit 11 causes the new card object 42 to be arranged rearmost of the overlapping card objects 42 (at the position that is closest to the rear surface side).

Next, the group setting unit 11 determines whether or not a card object 42 belonging to a specific group has been excluded from the group by the user (step A12). Specifically, the group setting unit 11 determines whether or not a card object 42 that exists inside of the frame line 44 of a specific group has been moved outside of the frame line 44 by the user.

If it is found as a result of the determination in step A12 that exclusion of a card object 42 has not been performed, step A14 is executed. On the other hand, if it is found as a result of the determination in step A12 that exclusion of a card object 42 has been performed, the group setting unit 11 excludes the card object 42 that is the exclusion target from the group to which it belongs (step A13).

Figure 10:
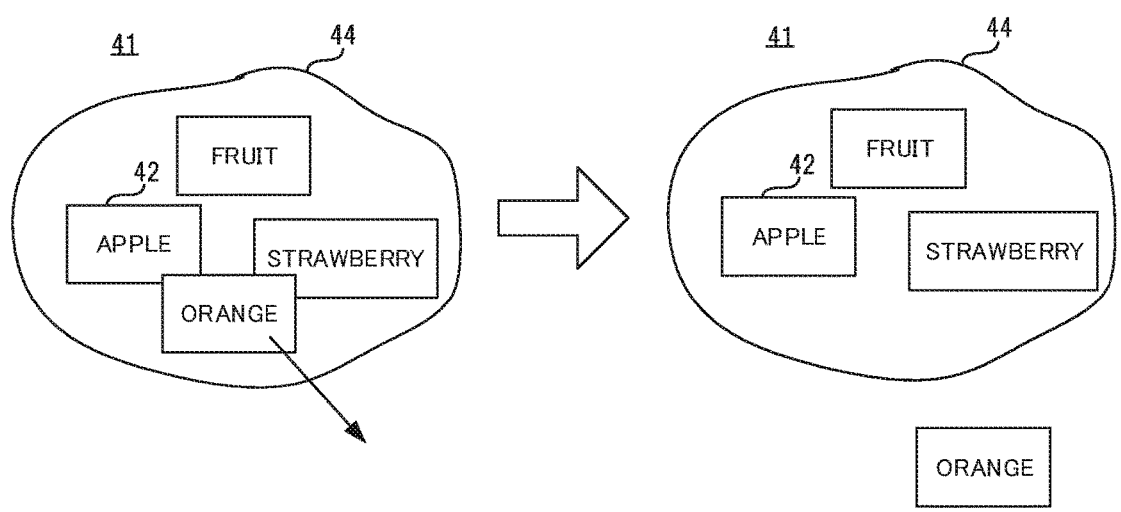
FIG. 10 is a diagram for illustrating processing performed in step A13 shown in FIG. 4.

Step A13 will be described in detail with reference to FIG. 10. FIG. 10 is a diagram for illustrating processing performed in step A13 shown in FIG. 4. As shown in FIG. 10, it is assumed that one certain card object 42 has been moved outside of the frame line 44 using a drag operation, a drop operation, and the like performed by the user in a group set using the frame line 44. In this case, the card object 42 that was moved outside of the frame line 44 is excluded from the original group.

Note that in the present embodiment, a card object 42 can be excluded from a group only when the group is in the expanded state. This is because movement of individual card objects 42 is not possible in a group that is in the converged state (see FIG. 8(b)).

Next, the group setting unit 11 determines whether or not an instruction to cancel the group setting by the user, or erasing of the frame line 44 has been performed by the user (step A14). If it is found as a result of the determination in step A14 that a canceling instruction or erasing of the frame line 44 has been performed, the group setting unit 11 cancels the setting of the target group (step A15).

Also, if it is determined as a result of the determination in step A14 that a canceling instruction or erasing of the frame line 44 has not been performed, or after step A15 is performed, the processing of the object management device 10 ends. Note that if the thinking assistance device 20 is in operation, steps A1 to A15 are executed repeatedly in a set interval.

Figure 11:
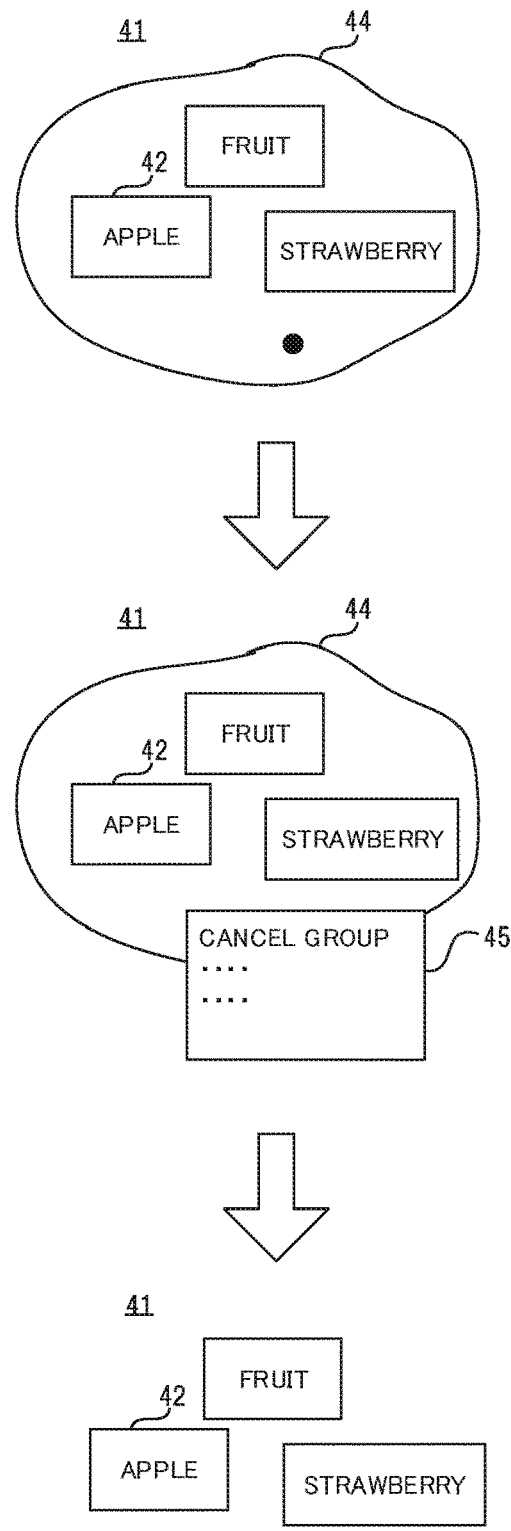
FIG. 11 is a diagram showing a state in which canceling of a group setting is instructed by the user.
Figure 12:
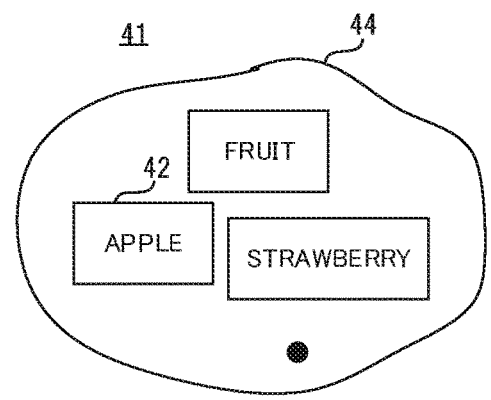
FIG. 12 is a diagram showing a state in which a frame that forms a group is erased by the user.
Figure 12:
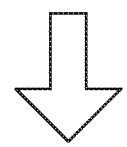
Figure 12:
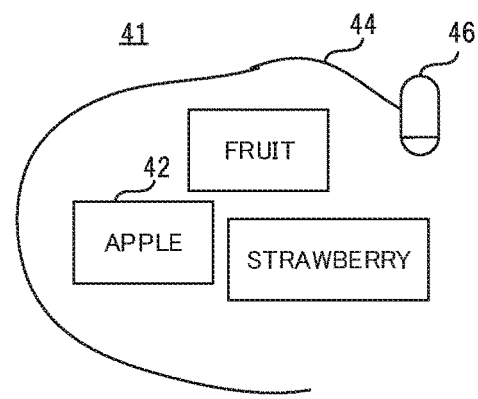
Figure 12:
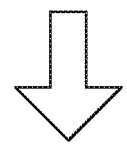
Figure 12:
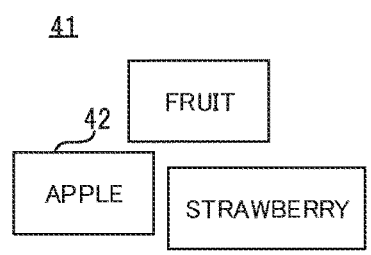
Figure 13:
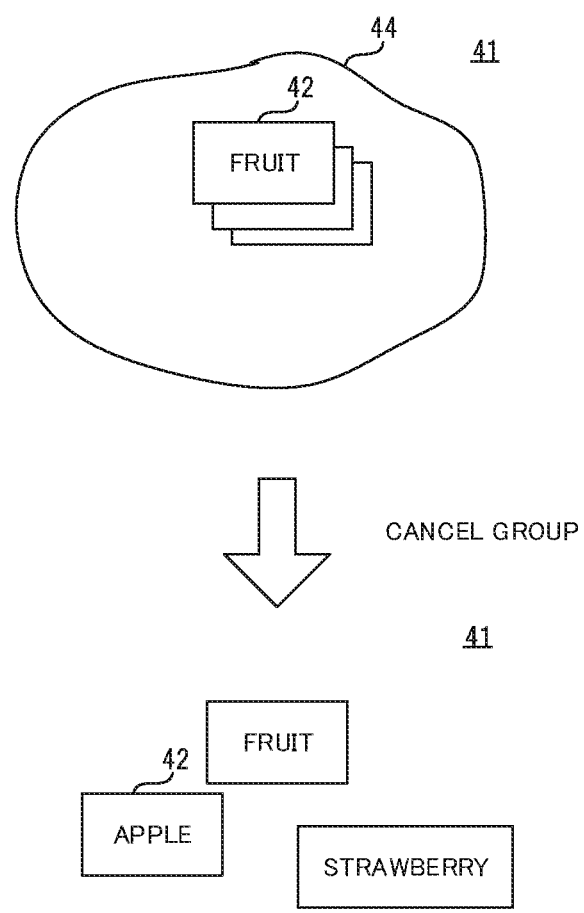
FIG. 13 is a diagram showing a case in which a group setting is canceled when the group is in a converged state.

Steps A14 and A15 will be described in detail with reference to FIGS. 11 to 13. FIG. 11 is a diagram showing a state in which canceling of a group setting is instructed by the user. FIG. 12 is a diagram showing a state in which a frame that forms a group is erased by the user. FIG. 13 is a diagram showing a case in which a group setting is canceled when the group is in a converged state.

In the example of FIG. 11, the group setting unit 11 displays a menu 45 when the user designates a region other than a card object 42 in the frame line 44 of the group that is to be canceled, using an operation such as a long press. Then, when the user selects "cancel group" in the menu 45, the group setting unit 11 determines that canceling of the group setting has been instructed. Thereafter, the group setting unit 11 cancels the group that is to be canceled and furthermore erases the frame line 44.

Also, in the example shown in FIG. 12, the group setting unit 11 determines that the frame line 44 has been erased when the user executes processing for erasing the frame line 44 using an erasing tool prepared in advance in the thinking assistance device 20. In this case as well, the group setting unit 11 cancels the group that is to be removed.

Note that the user can use the erasing tool to erase a portion of the frame line 44 and thereafter add a new line, thereby changing the region constituting the group. In this case, the group setting unit 11 uses the frame line 44 to which the new line was added as a reference to determine whether or not a newly-added card object 42 and a newly-excluded card object 42 exist, and if they do exist, the group setting unit 11 changes the group setting. Also, the position detection unit 12 uses the frame line 44 to which the new line was added as a reference to detect the positions of the objects once again. Also, in FIG. 12, reference numeral 46 indicates an object operated using the erasing tool. The object imitates the shape of a rubber eraser.

Also, as shown in FIG. 13, even if the group is in the converged state, step A15 is executed. In this case, when the group is canceled, the group setting unit 11 sets the group in the converged state to the expanded state. Note that in the example shown in FIG. 13 as well, the operation performed by the user is performed similarly to those in the examples shown in FIGS. 11 and 12.

As described above, with the present embodiment, a group can be moved on the screen 40 in a state in which the positions of the card objects constituting the group in the frame line are maintained, and therefore with the thinking tool, user-friendliness can be further improved in comparison to conventional thinking tools. Also, since the user can immediately recognize the objects belonging to the group by the frame line, an improvement in user-friendliness is achieved in this respect as well.

Furthermore, in the present embodiment, the user can expand and converge the card objects inside of the frame line and newly add a card object to the group, and therefore organizing and refining of ideas and the like can be performed more efficiently.

Also, for example, it is assumed that a card object outside of a group that is to be moved, or a group that is not a group to be moved exists at the moving destination designated by the user. In this case, the object management device 10 may arrange the group that is to be moved by overlaying it on the card object or group at the moving destination. Accordingly, the positions of the card objects and the frame line can be given a meaning that the user understands.

In the example described above, the object management device 10 is used in the thinking assistance device 20, which functions as a thinking tool. However, in the present embodiment, there is no limitation on the application of the object management device 10. The object management device 10 can be used without limitation, as long as the application is one in which cards or sticky notes are used on a screen. Examples of other applications include an electronic whiteboard, a to-do list, and an electronic schedule book.

Program

A program according to the present embodiment need only be a program for causing a computer to execute steps A1 to A15 in FIG. 4. The program is installed in a computer and executed, and thereby the object management device 10 and the object management method according to the present embodiment can be realized. In this case, the CPU (Central Processing Unit) of the computer functions as the group setting unit 11, the position detecting unit 12, the group moving unit 13, and the position changing unit 14, and performs processing. Also, examples of the computer include information apparatuses such as a smartphone and a tablet terminal, as well as a PC.

Physical Configuration

Figure 14:
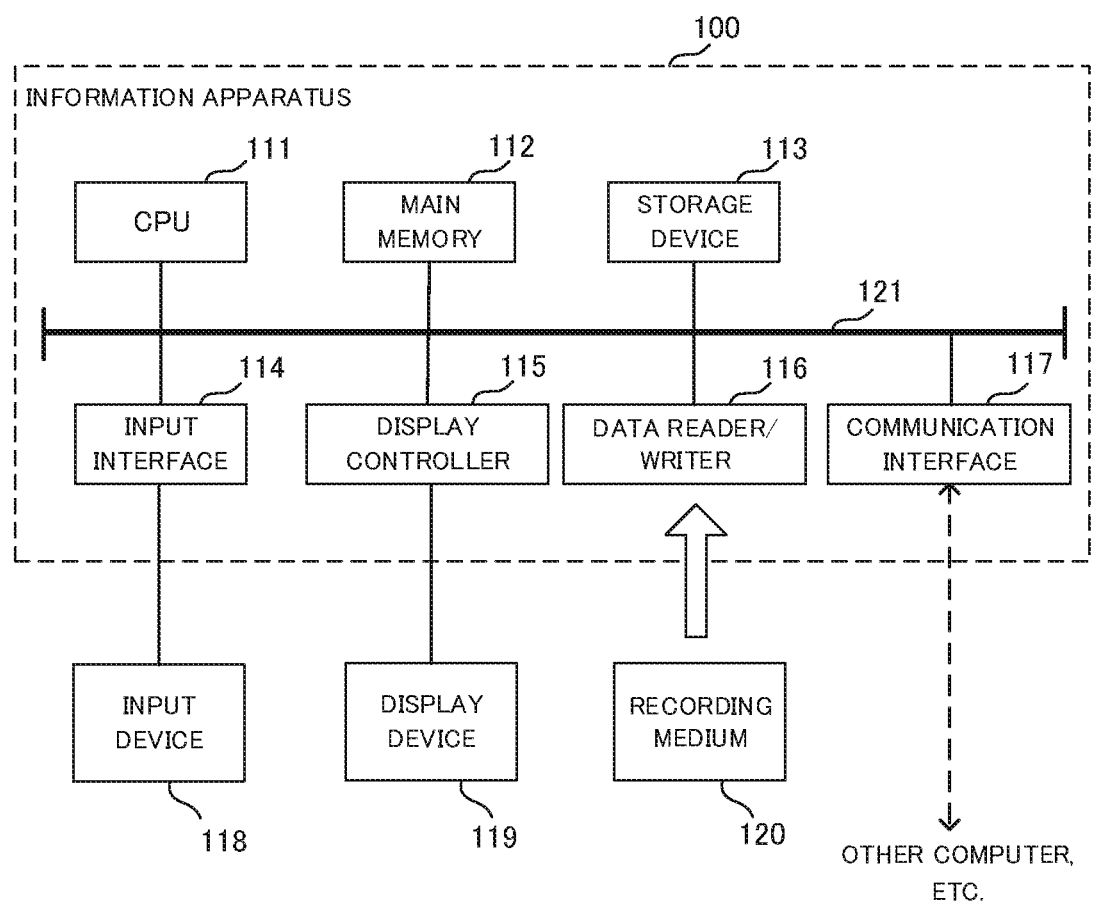
FIG. 14 is a block diagram showing an example of an information apparatus that realizes the object management device and the thinking assistance device according to an embodiment of the present invention.

Here, an example of an information apparatus that can construct the object management device and the thinking assistance device according to the present embodiment will be described with reference to FIG. 14. FIG. 14 is a block diagram showing an example of an information apparatus that realizes the object management device and the thinking assistance device according to an embodiment of the present invention. Note that in the example shown in FIG. 14, a PC is used as the information apparatus.

As shown in FIG. 14, the information apparatus (PC) 100 includes a CPU 111, a main memory 112, a storage device 113, an input interface 114, a display controller 115, a data reader/writer 116, and a communication interface 117. These units are connected so as to be able to perform data communication with each other via a bus 121.

The CPU 111 expands the programs (codes) according to the present embodiment, which are stored in the storage device 113, to the main memory 112 and executes them in a predetermined sequence, and thereby carries out various types of operations. The main memory 112 is typically a volatile storage device such as a DRAM (Dynamic Random Access Memory). Also, the program according to the present invention is provided in a state of being stored in a computer-readable storage medium 120. Note that the program according to the present embodiment may be distributed over the Internet, which is connected to via the communication interface 117.

Specific examples of the storage device 113 include a semiconductor storage device such as a flash memory, in addition to a hard disk drive. The input interface 114 mediates data transfer between the CPU 111 and an input device 118 such as a keyboard and a mouse. The display controller 115 is connected to the display device 119 and controls display on the display device 119.

The data reader/writer 116 mediates data transfer between the CPU 111 and the recording medium 120, reads out programs from the recording medium 120, and writes processing results of the computer 110 in the recording medium 120. The communication interface 117 mediates data transfer between the CPU 111 and another computer.

Specific examples of the recording medium 120 include a general-purpose semiconductor storage device such as a CF (Compact Flash) and an SD (Secure Digital), a magnetic storage medium such as a flexible disk, or an optical storage medium such as a CD-ROM (Compact Disk Read Only Memory).

Also, a portion or the entirety of the above-described embodiment can be realized by Supplementary Notes 1 to 22 disclosed below, but there is no limitation to the disclosure below.

Supplementary Note 1

An object management device for managing objects displayed on a screen, including:

a group setting unit configured to, if a frame line surrounding one or more of the objects is rendered on the screen, set a group to which the one or more objects located in the frame line belong;

a position detection unit configured to detect positions of the one or more objects belonging to the set group, using the frame line as a reference; and a group moving unit configured to, if moving is instructed for a group, move the frame line and the one or more objects based on the positions of the one or more objects detected by the position detection unit, in a state in which positional relationships between the frame line and the one or more objects are maintained.

Supplementary Note 2

The object management device according to Supplementary Note 1, wherein if another object not belonging to the group is moved inside of the frame line according to which the group was set, the group setting unit causes the other object that was moved to belong to the group, and when the other object belongs to the group, the position detection unit detects a position of the other object, using the frame line according to which the group was set as a reference.

Supplementary Note 3

The object management device according to Supplementary Note 1, further including a position changing unit configured to, if any one of two or more said objects located inside of the frame line is designated, overlay the two or more objects in a normal line direction of the screen such that the designated object is located at a topmost position, wherein when the two or more objects are overlaid in the normal line direction of the screen, the position detection unit detects respective positions of the two or more objects in the overlaid state, using the frame line as a reference, when the two or more objects are overlaid in the normal line direction of the screen, the group moving unit moves the frame line and the two or more objects in the overlaid state, and if canceling of overlaying is instructed, the position changing unit returns the respective positions of the two or more objects overlaid in the normal line direction of the screen to positions prior to overlaying being performed.

Supplementary Note 4

The object management device according to Supplementary Note 1, wherein if canceling of a setting of the group is instructed, or if processing for erasing the frame line is performed, the group setting unit cancels the setting of the group.

Supplementary Note 5

The object management device according to Supplementary Note 1, wherein when a new frame line is rendered, if another frame line according to which a group has already been set exists inside of the new frame line, the group setting unit sets a new group including the objects inside of the other frame line.

Supplementary Note 6

The object management device according to Supplementary Note 1, wherein if a new frame line is rendered inside of a frame line that has already been rendered, the group setting unit sets a new group for the one or more objects located inside of the new frame line.

Supplementary Note 7

The object management device according to Supplementary Note 1, wherein the objects are card-shaped objects.

Supplementary Note 8

A thinking assistance device for assisting thinking of a user using card-shaped objects displayed on a screen, including:

a display unit configured to display a canvas on the screen and furthermore display the card-shaped objects at a designated position on the canvas; a text writing unit configured to write input text on the designated card-shaped object; and an object management unit, wherein the object management unit includes:

a group setting unit configured to, if a frame line surrounding one or more of the card-shaped objects has been rendered on the screen, set a group to which the one or more card-shaped objects located inside of the frame line belong;

a position detection unit configured to detect positions of the one or more card-shaped objects belonging to the set group, using the frame line as a reference; and a group moving unit configured to, if moving is instructed for the group, move the frame line and the one or more card-shaped objects based on the positions of the one or more card-shaped objects detected by the position detection unit, in a state in which positional relationships between the frame line and the one or more card-shaped objects are maintained.

Supplementary Note 9

An object management method for managing objects displayed on a screen, including:

a step (a) of, if a frame line surrounding one or more of the objects is rendered on the screen, setting a group to which the one or more objects located in the frame line belong;

a step (b) of detecting positions of the one or more objects belonging to the set group, using the frame line as a reference; and a step (c) of, if movement is instructed for the group, moving the frame line and the one or more objects based on the positions of the one or more objects detected in the step (b), in a state in which positional relationships between the frame line and the one or more objects are maintained.

Supplementary Note 10

The object management method according to Supplementary Note 9, further including:

a step (d) of, if another object not belonging to the group has been moved inside of the frame line according to which the group was set, causing the other object that was moved to belong to the group; and a step (e) of, when the other object belongs to the group due to the step (d), detecting a position of the other object using the frame line according to which the group was set as a reference.

Supplementary Note 11

The object management method according to Supplementary Note 9, further including:

a step (f) of, if any one of two or more said objects located inside of the frame line has been designated, overlaying the two or more objects in a normal line direction of the screen such that the designated object is located at a topmost position;

a step (g) of, when the two or more objects are overlaid in the normal line direction of the screen due to the step (f), detecting respective positions of the two or more objects in the overlaid state, using the frame line as a reference;

a step (h) of, if movement is instructed for the group when the two or more objects are overlaid in the normal line direction of the screen due to the step (f), moving the frame line and the two or more objects in the overlaid state based on the positions of the two or more objects detected in the step (g); and a step (i) of, if canceling of overlaying has been instructed, returning the respective positions of the two or more objects overlaid in the normal line direction of the screen to the positions prior to overlaying being performed.

Supplementary Note 12

The object management method according to Supplementary Note 9, further including a step (j) of, if canceling of a setting of the group is instructed, or if processing for erasing the frame line is performed, canceling the setting of the group.

Supplementary Note 13

The object management method according to Supplementary Note 9, wherein in the step (a), when a new frame line is rendered, if another frame line according to which a group has already been set exists inside of the new frame line, a new group is set including the objects inside of the other frame line.

Supplementary Note 14

The object management method according to Supplementary Note 9, wherein in the step (a), if a new frame line is rendered inside of a frame line that has already been rendered, the group setting unit sets a new group for the one or more objects located inside of the new frame line.

Supplementary Note 15

The object management method according to Supplementary Note 9, wherein the objects are card-shaped objects.

Supplementary Note 16

A computer-readable storage medium storing a program for managing objects displayed on a screen by a computer, including commands for causing the computer to execute:

a step (a) of, if a frame line surrounding one or more of the objects is rendered on the screen, setting a group to which the one or more objects located in the frame line belong;

a step (b) of detecting positions of the one or more objects belonging to the set group, using the frame line as a reference; and a step (c) of, if moving is instructed for a group, moving the frame line and the one or more objects based on the positions of the one or more objects detected in the step (b), in a state in which positional relationships between the frame line and the one or more objects are maintained.

Supplementary Note 17

The computer-readable storage medium according to Supplementary Note 16, wherein the program further includes commands for causing the computer to execute:

a step (d) of, if another object not belonging to the group has been moved inside of the frame line according to which the group was set, causing the other object that was moved to belong to the group; and a step (e) of, when the other object belongs to the group due to the step (d), detecting a position of the other object using the frame line according to which the group was set as a reference.

Supplementary Note 18

The computer-readable storage medium according to Supplementary Note 16, wherein the program further includes commands for causing the computer to execute:

a step (f) of, if any one of two or more said objects located inside of the frame line has been designated, overlaying the two or more objects in a normal line direction of the screen such that the designated object is located at a topmost position;

a step (g) of, when the two or more objects are overlaid in the normal line direction of the screen due to the step (f), detecting respective positions of the two or more objects in the overlaid state, using the frame line as a reference;

a step (h) of, if movement is instructed for the group when the two or more objects are overlaid in the normal line direction of the screen due to the step (f), moving the frame line and the two or more objects in the overlaid state, based on the positions of the two or more objects detected in the step (g); and a step (i) of, if canceling of overlaying has been instructed, returning the respective positions of the two or more objects overlaid in the normal line direction of the screen to the positions prior to overlaying being performed.

Supplementary Note 19

The computer-readable storage medium according to Supplementary Note 16, wherein the program further includes commands for causing the computer to execute a step (j) of, if canceling of a setting of the group is instructed, or if processing for erasing the frame line is performed, canceling the setting of the group.

Supplementary Note 20

The computer-readable storage medium according to Supplementary Note 16, wherein in the step (a), when a new frame line has been rendered, if another frame line according to which a group has already been set exists inside of the new frame line, a new group is set including the objects inside of the other frame line.

Supplementary Note 21

The computer-readable storage medium according to Supplementary Note 16, wherein in the step (a), if a new frame line is rendered inside of a frame line that has already been rendered, the group setting unit sets a new group for one or more said objects located inside of the new frame line.

Supplementary Note 22

The computer-readable storage medium according to Supplementary Note 16, wherein the objects are card-shaped objects.

The invention of the present application has been described above with reference to an embodiment, but the present invention is not limited to the above-described embodiment. Configurations and details of the present invention can be changed in various ways that can be understood by a person skilled in the art, within the scope of the present invention.

This application claims priority on the basis of Japanese Patent Application 2014-180846, filed on Sep. 5, 2014, the contents of which are incorporated herein in its entirety.

INDUSTRIAL APPLICABILITY

As described above, according to the present invention, movement of objects in a grouped-together state is possible in the case where objects displayed on a screen have been grouped together. The present invention is useful for a thinking tool that supports creation of ideas using card-shaped objects.

REFERENCE SIGNS LIST

10 Object management device (object management unit)
11 Group setting unit
12 Position detection unit
13 Group moving unit
14 Position changing unit
20 Thinking assistance device
21 Display unit
22 Text writing unit
100 Information apparatus (PC)
101 OS
102 Input device
103 Display device
111 CPU
112 Main memory
113 Storage device
114 Input interface
115 Display controller
116 Data reader/writer
117 Communication interface
118 Input device
119 Display device
120 Recording medium
121 Bus

What is claimed is:

1. An object management device for managing objects displayed on a screen, comprising:

a group setting unit configured to, if a frame line surrounding one or more of the objects is rendered on the screen, set a group to which the one or more objects located in the frame line belong;

a position detection unit configured to detect positions of the one or more objects belonging to the set group, using the frame line as a reference;

a group moving unit configured to, if moving is instructed for a group, move the frame line and the one or more objects based on the positions of the one or more objects detected by the position detection unit, in a state in which positional relationships between the frame line and the one or more objects are maintained; and a position changing unit configured to, if any one of two or more said objects located inside of the frame line is designated, overlay the two or more objects in a normal line direction of the screen such that the designated object is located at a topmost position, wherein when the two or more objects are overlaid in the normal line direction of the screen, the position detection unit detects respective positions of the two or more objects in the overlaid state, using the frame line as a reference, when the two or more objects are overlaid in the normal line direction of the screen, the group moving unit moves the frame line and the two or more objects in the overlaid state, and if canceling of overlaying is instructed, the position changing unit returns the respective positions of the two or more objects overlaid in the normal line direction of the screen to positions prior to overlaying being performed, wherein the object management device is realized by a computer, a processor of the computer functioning as the group setting unit, the position detection unit, the group moving unit, and the position changing unit.

2. The object management device according to claim 1, wherein if another object not belonging to the group is moved inside of the frame line according to which the group was set, the group setting unit causes the other object that was moved to belong to the group, and when the other object belongs to the group, the position detection unit detects a position of the other object, using the frame line according to which the group was set as a reference.

3. The object management device according to claim 1, wherein if canceling of a setting of the group is instructed, or if processing for erasing the frame line is performed, the group setting unit cancels the setting of the group.

4. The object management device according to claim 1, wherein when a new frame line is rendered, if another frame line according to which a group has already been set exists inside of the new frame line, the group setting unit sets a new group including the objects inside of the other frame line.

5. The object management device according to claim 1, wherein if a new frame line is rendered inside of a frame line that has already been rendered, the group setting unit sets a new group for the one or more objects located inside of the new frame line.

6. The object management device according to claim 1, wherein the objects are card-shaped objects.

7. An object management method for managing objects displayed on a screen, comprising:
   a step (a) of, if a frame line surrounding one or more of the objects is rendered on the screen, setting a group to which the one or more objects located in the frame line belong;
   a step (b) of detecting positions of the one or more objects belonging to the set group, using the frame line as a reference;
   a step (c) of, if movement is instructed for the group, moving the frame line and the one or more objects based on the positions of the one or more objects detected in the step (b), in a state in which positional relationships between the frame line and the one or more objects are maintained; and
   a step (f) of, if any one of two or more said objects located inside of the frame line has been designated, overlaying the two or more objects in a normal line direction of the screen such that the designated object is located at a topmost position;
   a step (g) of, when the two or more objects are overlaid in the normal line direction of the screen due to the step (f), detecting respective positions of the two or more objects in the overlaid state, using the frame line as a reference;
   a step (h) of, if movement is instructed for the group when the two or more objects are overlaid in the normal line direction of the screen due to the step (f), moving the frame line and the two or more objects in the overlaid state based on the positions of the two or more objects detected in the step (g); and
   a step (i) of, if canceling of overlaying has been instructed, returning the respective positions of the two or more objects overlaid in the normal line direction of the screen to the positions prior to overlaying being performed.

8. The object management method according to claim 7, further comprising:
   a step (d) of, if another object not belonging to the group has been moved inside of the frame line according to which the group was set, causing the other object that was moved to belong to the group; and
   a step (e) of, when the other object belongs to the group due to the step (d), detecting a position of the other object using the frame line according to which the group was set as a reference.

9. The object management method according to claim 7, further comprising a step (j) of, if canceling of a setting of the group is instructed, or if processing for erasing the frame line is performed, canceling the setting of the group.

10. The object management method according to claim 7, wherein in the step (a), when a new frame line is rendered, if another frame line according to which a group has already been set exists inside of the new frame line, a new group is set including the objects inside of the other frame line.

11. The object management method according to claim 7, wherein in the step (a), if a new frame line is rendered inside of a frame line that has already been rendered, the group setting unit sets a new group for the one or more objects located inside of the new frame line.

12. A non transitory computer-readable storage medium storing a program for managing objects displayed on a screen by a computer, including commands for causing the computer to execute:
   a step (a) of, if a frame line surrounding one or more of the objects is rendered on the screen, setting a group to which the one or more objects located in the frame line belong;
   a step (b) of detecting positions of the one or more objects belonging to the set group, using the frame line as a reference;
   a step (c) of, if moving is instructed for a group, moving the frame line and the one or more objects based on the positions of the one or more objects detected in the step (b), in a state in which positional relationships between the frame line and the one or more objects are maintained;
   a step (f) of, if any one of two or more said objects located inside of the frame line has been designated, overlaying the two or more objects in a normal line direction of the screen such that the designated object is located at a topmost position;
   a step (g) of, when the two or more objects are overlaid in the normal line direction of the screen due to the step (f), detecting respective positions of the two or more objects in the overlaid state, using the frame line as a reference;
   a step (h) of, if movement is instructed for the group when the two or more objects are overlaid in the normal line direction of the screen due to the step (f), moving the frame line and the two or more objects in the overlaid state, based on the positions of the two or more objects detected in the step (g); and
   a step (i) of, if canceling of overlaying has been instructed, returning the respective positions of the two or more objects overlaid in the normal line direction of the screen to the positions prior to overlaying being performed.

13. The non transitory computer-readable storage medium according to claim 12,
   wherein the program further includes commands for causing the computer to execute:
   a step (d) of, if another object not belonging to the group has been moved inside of the frame line according to which the group was set, causing the other object that was moved to belong to the group; and a step (e) of, when the other object belongs to the group due to the step (d), detecting a position of the other object using the frame line according to which the group was set as a reference.

14. The non transitory computer-readable storage medium according to claim 12, wherein the program further includes commands for causing the computer to execute a step (j) of, if canceling of a setting of the group is instructed, or if processing for erasing the frame line is performed, canceling the setting of the group.

15. The non transitory computer-readable storage medium according to claim 12, wherein in the step (a), when a new frame line has been rendered, if another frame line according to which a group has already been set exists inside of the new frame line, a new group is set including the objects inside of the other frame line.

16. The non transitory computer-readable storage medium according to claim 12, wherein in the step (a), if a new frame line is rendered inside of a frame line that has already been rendered, the group setting unit sets a new group for one or more said objects located inside of the new frame line.

* * * * *